United States Patent [19]

Tsonis et al.

[11] Patent Number: 5,506,784
[45] Date of Patent: Apr. 9, 1996

[54] METHOD FOR AUTOMATICALLY GENERATING A CHENILLE FILLED EMBROIDERY STITCH PATTERN

[75] Inventors: Anastasios Tsonis, Village of Conestogo; Brian J. Goldberg, Thornhill; Aaron M. Divinsky; Alexander Nicolaou, both of Mississauga, all of Canada

[73] Assignee: Pulse Microsystems Ltd., Mississauga, Canada

[21] Appl. No.: 323,157

[22] Filed: Oct. 14, 1994

[51] Int. Cl.$^6$ .................................................. G05B 19/18
[52] U.S. Cl. ..................................... 364/470; 112/475.19
[58] Field of Search ........................... 364/470, 185–193; 112/103, 102, 457, 546, 121.12, 121.11, 454, 121.13

[56] References Cited

U.S. PATENT DOCUMENTS 5,056,444  10/1991  Lowry et al. .
5,151,863   9/1992  Komura et al. ........................ 364/470
5,189,622   2/1993  Hayakawa et al. .................... 364/470
5,270,939  12/1993  Goldberg et al. .
5,283,747   2/1994  Komuro et al. ....................... 364/470
5,343,401   8/1994  Goldberg et al. .

OTHER PUBLICATIONS

"Voronoi Diagrams of Polygons: A Framework For Shape Representation," N. Mayya and V. T. Rajan, Proceedings of IEEE CVPR 1994, Seattle, Washington.

Primary Examiner—James P. Trammell
Attorney, Agent, or Firm—Brian Cave

[57] ABSTRACT

The present invention is an improved method for automatically generating chenille filled embroidery stitch patterns and/or chain stitching in a computer aided design system in which the shape to be filled is a complex polygon. The medial axis of the polygon is determined, concentric polygons are then constructed and sorted and spirals are placed along the polygons with stitches being placed along the spirals. For chain stitching, rather than placing spirals, the chain stitches are placed on the perimeter of the concentric polygons.

11 Claims, 23 Drawing Sheets

A. Spiral type chenille

1. Determine the "medial axis"

Create rays emanating in towards the shape from every corner of the shape that is less than 90 degrees by constructing a vector that bisects the angle of the corner.

For corners that have an interior angle greater than 90 degrees, two rays must be constructed each pointing in a direction perpendicular to one of the edges of the corner.

Put all these rays in a *circular list*.

While there are rays in the list:

Call the first element in the list the head.

If the head points directly into another ray, remove the head and the other ray from the list, add them to a list of final rays.

Find an edge that forces the head to stop and call it the closest candidate.

Use the closest candidate and the head to compute all new rays that emanate from the head's endpoint.

Add the new rays to the list; remove the head and add it to the list of final rays.

2. Construct concentric polygons

For all the segments in the whole shape:

For each edge in the original polygon, construct a new polygon made up of those edges of the medial axis that are closest to the edge being considered.

Sweep a line through the polygon and compute all the segments of all positions of the line that fall in the interior of the polygon.

Determine for each edge which edges are adjacent to it to construct the concentric polygons.

Output the list of polygons.

3. Sort the polygons

4. Place spirals along the polygons

5. Generate Prolate Cycloids

6. Place stitches along the spirals

A. Spiral type chenille

1. Determine the "medial axis"

Create rays emanating in towards the shape from every corner of the shape that is less than 90 degrees by constructing a vector that bisects the angle of the corner.

For corners that have an interior angle greater than 90 degrees, two rays must be constructed each pointing in a direction perpendicular to one of the edges of the corner.

Put all these rays in a *circular list*.

While there are rays in the list:

Call the first element in the list the head.

If the head points directly into another ray, remove the head and the other ray from the list, add them to a list of final rays.

FROM FIGURE 7A

Find an edge that forces the head to stop and call it the closest candidate.

Use the closest candidate and the head to compute all new rays that emanate from the head's endpoint.

Add the new rays to the list; remove the head and add it to the list of final rays.

2. Construct concentric polygons

For all the segments in the whole shape:

For each edge in the original polygon, construct a new polygon made up of those edges of the medial axis that are closest to the edge being considered.

FROM FIGURE 7B

B. Chain stitching

1. Determine the "medial axis"

Create rays emanating in towards the shape from every corner of the shape that is less than 90 degrees by constructing a vector that bisects the angle of the corner.

For corners that have an interior angle greater than 90 degrees, two rays must be constructed each pointing in a direction perpendicular to one of the edges of the corner.

Put all these rays in a *circular list*.

While there are rays in the list:

Call the first element in the list the head.

If the head points directly into another ray, remove the head and the other ray from the list, add them to a list of final rays.

FROM FIGURE 8A

↓

Find an edge that forces the head to stop and call it the closest candidate.

↓

Use the closest candidate and the head to compute all new rays that emanate from the head's endpoint.

↓

Add the new rays to the list; remove the head and add it to the list of final rays.

2. Construct concentric polygons

For all the segments in the whole shape:

↓

For each edge in the original polygon, construct a new polygon made up of those edges of the medial axis that are closest to the edge being considered.

FROM FIGURE 8B

Sweep a line through the polygon and compute all the segments of all positions of the line that fall in the interior of the polygon.

Determine for each edge which edges are adjacent to it to construct the concentric polygons.

Output the list of polygons.

3. Sort the polygons

4. Place Chain stitches on the perimeter of the concentric polygons at a specified length

FIGURE 8C

METHOD FOR AUTOMATICALLY GENERATING A CHENILLE FILLED EMBROIDERY STITCH PATTERN

CROSS-REFERENCE TO RELATED APPLICATIONS

This application is related to our copending contemporaneously filed United States patent application entitled "Method for Automatically Generating Chain Stitches"; Ser. No. 08/323,156 the contents of which is specifically incorporated by reference herein in its entirety.

BACKGROUND OF THE INVENTION

1. Field of the Invention

The present invention relates to methods for automatically generating filled embroidery patterns in a computer aided design system, and more particularly to an improved method for automatically generating a chenille filled embroidery stitch pattern in a computer aided design system.

2. Description of the Prior Art

Computer aided design systems for controlling embroidery machines are well known in the art. Such systems allow the user to select embroidery patterns to be stitched either through a stored series of designs or creation of original designs, such as described in our copending United States patent application entitled "Method for Creating Self-Generating Embroidery Pattern", filed Oct. 4, 1993, and bearing U.S. Ser. No. 08/131,142, U.S. Pat. No. 5,430,658 and our previously issued U.S. Pat. No. 5,343,401, entitled "Embroidery Design System". In such prior art systems, embroidery patterns may typically be generated in an outline form of a particular shape such as a letter or an animal, or may be filled in with stitches. It is also known in the art to be able to modify the embroidery design programs used in such computer aided design systems so that the user may independently vary and modify a large variety of characteristics of an existing embroidery design program including, such as described in our previously issued U.S. Pat. No. 5,270,939.

In addition, chenille type embroidery machines capable of providing chenille type stitching, which produces a towel like effect in the embroidery pattern, are also well known, such as disclosed, by way of example, in U.S. Pat. No. 5,056,444. A typical conventional chenille type embroidery machine is manufactured by Tajima Industries Ltd. of Japan. As noted in U.S. Pat. No. 5,056,444, which describes a prior art chenille type embroidery machine, chenille type embroidery machines provide a fuzzy appearance of a pattern, for example, such as on an athletic award or letter, with the fuzzy appearance being formed by the use of a hooked needle which, in combination with a looper, which wraps thread around the needle (as illustrated in FIGS. 1A–1E), pulls a thread through a piece of material. Such a stitch is known as a "moss" stitch and is performed by the looper looping thread over the hook of the needle below the material to be embroidered. The needle then pulls the looped thread through and above the material. Another device known as the X/Y drive then pulls the material away from the raised needle causing the looped thread to slip off the hook. The needle again penetrates the material and the process is repeated, resulting in a fuzzy patterned item.

By reversing the hook of the needle so that the looped thread remains on the hook after the X/Y movement of the material, a chain stitch can be formed. In such an instance, the X/Y drive pulls the material and the thread as in the above described prior art moss stitch procedure, but now the thread remains on the hook as the needle repenetrates the material and a linked chain stitch is formed, such as illustrated in FIGS. 2A–2E. Chain stitching is generally used to follow the perimeter of a shape. Chenille stitching may be used to create a cross hatch or lattice chenille, such as illustrated in FIG. 3, or a spiral type chenille. In a lattice chenille, the pattern that is created by the loop stitch in order to fill a shape, with the stitching starting at one point in the shape and moving in straight lines diagonally covering the area, whereas in a spiral type chenille, in order to fill the shape the stitching is performed in a spiral fashion causing the embroidery machine to place stitches at many varying angles to provide a random/hand-done appearance.

Chenille stitching in the past was generally performed by hand which is a very tedious, time consuming task, and did not utilize the advantages of a computer aided design system which could allow the operator to make decisions on how the coverage would take place. Prior to applicants' invention, spiral coverage for chenille stitches was not automatically generated, but, rather, was accomplished either by hand or manually entered in the computer. Thus, applicants are not aware of any efficient prior art computer aided design systems for generating filled embroidery patterns which enable chenille filled embroidery patterns, or chain stitches, to be automatically generated and this is so despite the wide spread use of computer aided design systems for controlling embroidery machines.

SUMMARY OF THE INVENTION

In a method for automatically generating filled embroidery stitch patterns in a computer aided design system capable of generating embroidery stitch patterns, the improvement comprises automatically generating a chenille filled embroidery pattern by selecting an associated polygon type shape, determining a medial axis for that shape, constructing a plurality of concentric polygon shapes extending from the medial axis to the outer edge of the selected polygon shape, sorting the constructed concentric polygon shapes for proper sequencing and minimal jumping of the selected pattern from one part to another, placing a plurality of spirals of varying size along the constructed concentric polygons for maintaining a consistent filling of the area contained within the selected shape, and stitching along the plurrailty of placed spirals for creating thread loops for providing the chenille type stitching to fill the selected polygon shape. The spacing between the adjacent concentric polygons and the spiral size and distance between the focal points from one spiral to another comprise the dterminants of the fill density associated with the selected polygon shape. Chain stitching is provided around the selected polygon shape for covering the chenille filled embroidery pattern with chain stitches, with the chain stitches being placed on the perimeter of the constructed concentric polygon shapes at a predetermined length. The improved method of automatically generating chain stitches is preferably the same as for automatically generating chenille stitching with the exception that rather than placing the spirals along the concentric polygons after the concentric polygons have been constructed in the computer aided design system, the chain stitches are then placed on the perimeter of the concentric polygons.

BRIEF DESCRIPTION OF THE DRAWINGS

FIG. 8 is a system flow diagram, similar to FIG. 7, of the presently preferred method of automatically generating chain stitching in accordance with the present invention.

DETAILED DESCRIPTION OF THE INVENTION

Figure 6A:
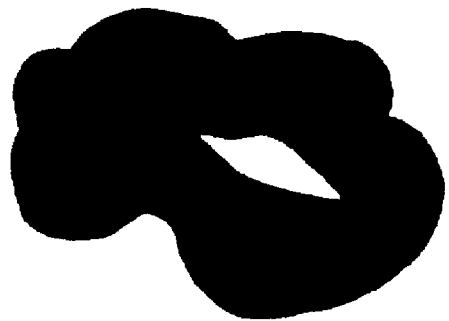
FIGS. 6A–6C are diagrammatic illustrations of a typical polygonal approximation procedure in accordance with the preferred method of the present invention.
Figure 6B:
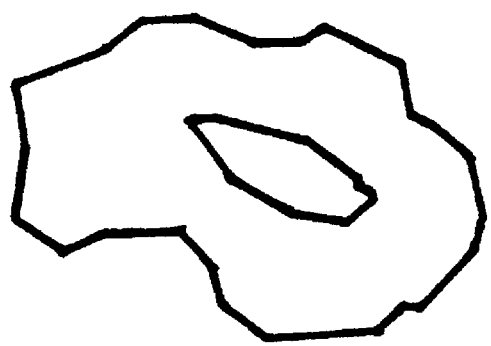
Figure 6C:
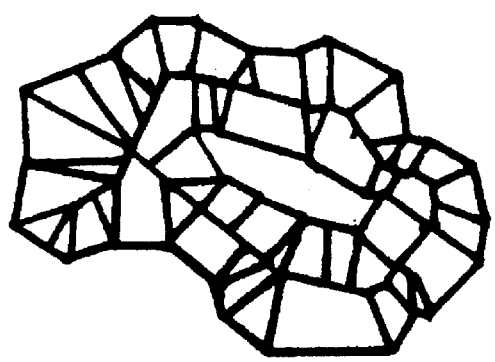

Referring to the drawings in detail, and initially to FIGS. 6A–6C, a typical framework for determining the medial axis of a polygon shape is illustrated. This framework is described in "Voronoi diagrams of Polygons: A Framework for Shape Representation", N. Mayya and V. T. Rajan, Proceedings of IEEE VVPR 1994, Seattle, Wash. In addition, the algorithm for analyzing the shape to be filled to determine its medial axis, sometimes referred to as its skeleton, is described in "A transformation for extracting new descriptors of shape", Models for the Perception of Speech and Visual Form (W. Wathen-Dunn, ed.), H. Blum, 1967, Cambridge Mass.: MIT Press. In accordance with the presently preferred method of the present invention, it is employed in a conventional computer aided design system for generating embroidery stitch patterns, such as described in our U.S. Pat. No. 5,343,401, the contents of which are incorporated by reference herein in their entirety, with the computer employed typically being an IBM PC compatible computer running Microsoft Windows and programmed in the language known as "C++". Thus, as will be explained hereinafter, the method of the present invention adds the capability of automatically generating chenille as well as chain stitching to the embroidery designs which the computer aided design system can generate.

Figure 7C:
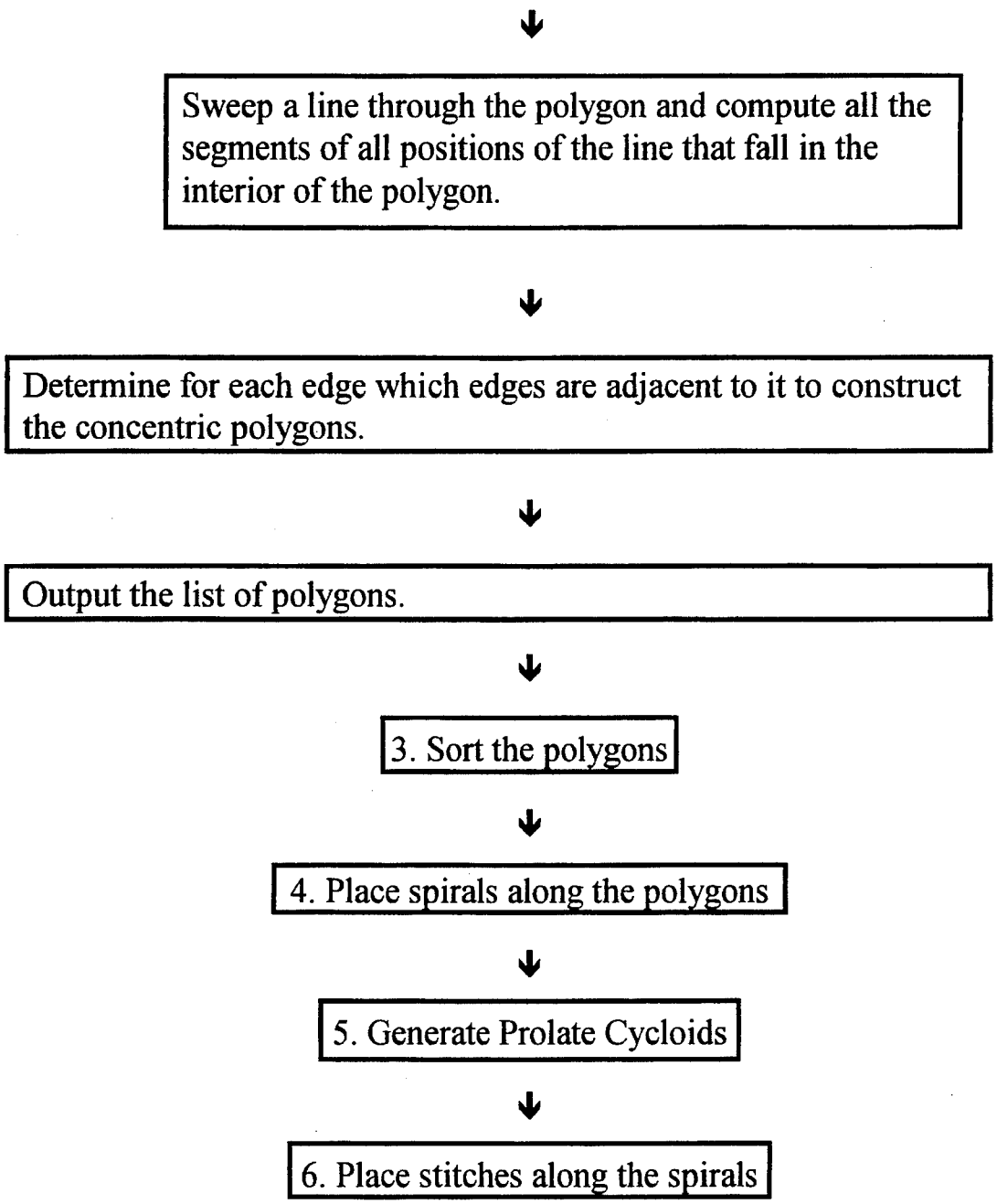
FIG. 7 is a system flow diagram of the presently preferred method of automatically generating a spiral type chenille in accordance with the present invention.

As shown and preferred in FIG. 7, in accordance with the presently preferred method of the present invention for automatically generating spiral type chenille to provide a chenille filled embroidery pattern, first the shape to be filled is analyzed to determine its medial axis, with the shape to be filled preferably comprising a complex polygon with or without holes. In accomplishing this analysis, the computer preferably creates rays emanating in towards the selected polygon shape from every corner of the shape that is less than 90 degrees by constructing a vector that bisects the angle of the corner. For corners of the selected complex polygon shape that have an interior angle that is greater than 90 degrees, preferably two rays are constructed by the computer, each pointing in a direction normal or perpendicular to one of the edges of the corner. The computer then preferably puts all of the rays in a circular list which is a list in which the last element points back to the first element. While these rays are in the circular list, preferably the computer calls the first elwement in the list the head and if the head points directly into another ray, the computer then removes the head and the other ray from the list, adds them to a list of final rays, and returns to calling the first element remaining in the list the head and repeats the procedure. The computer then finds an edge in the polygon that forces the head to stop and calls it the closest candidate and then uses the closest candidate and the head to compute all new rays that emanate from the head's endpoint. The new rays are then preferably added to the list, the head is removed and added to the list of final rays, and the entire procedure is repeated for rays remaining in the list, with the process being stopped when the list is empty and all rays have been added to the final list.

Having determined the medial axis, preferably the computer determines concentric polygons going from the outer edge of the selected shape to the medial axis. The distance between the concentric polygons is one of the determinants of the fill. In constructing the concentric polygons, the computer preferably, for each edge in the original selected polygon, constructs a new polygon made up of those edges of the medial axis that are closest to the edge being considered, sweeps a line through the polygon which has been generated and computes all the segments of all positions of the line that fall in the interior of the polygon and, once this has been done for all the segments in the whole shape, determines for each edge which edges are adjacent to it to construct the concentric polygons. The computer then outputs the list of polygons. Thereafter, the computer sorts these concentric polygons in order to allow for proper sequencing and minimal jumping from one part of the shape to another. In carrying out this sorting, preferably the polygons are sorted to determine which are inside which and, once all the polygons are sorted, they form a tree rooted at the outline of the selected shape. The outline preferably has one or more children which each, in turn, have one or more children inside them. Once the tree is constructed, preferably a standard depth first search is used to stitch the polygons in the correct order from the center emanating outwards to ensure that the stitches are in an order that will sew well and produce the desired design. Preferably, between each subtree of polygons, the location of the next subtree is run by following the edges of the previously constructed medial axis which ensures that connecting runs are in the interior of the selected shape.

Figure 1A:
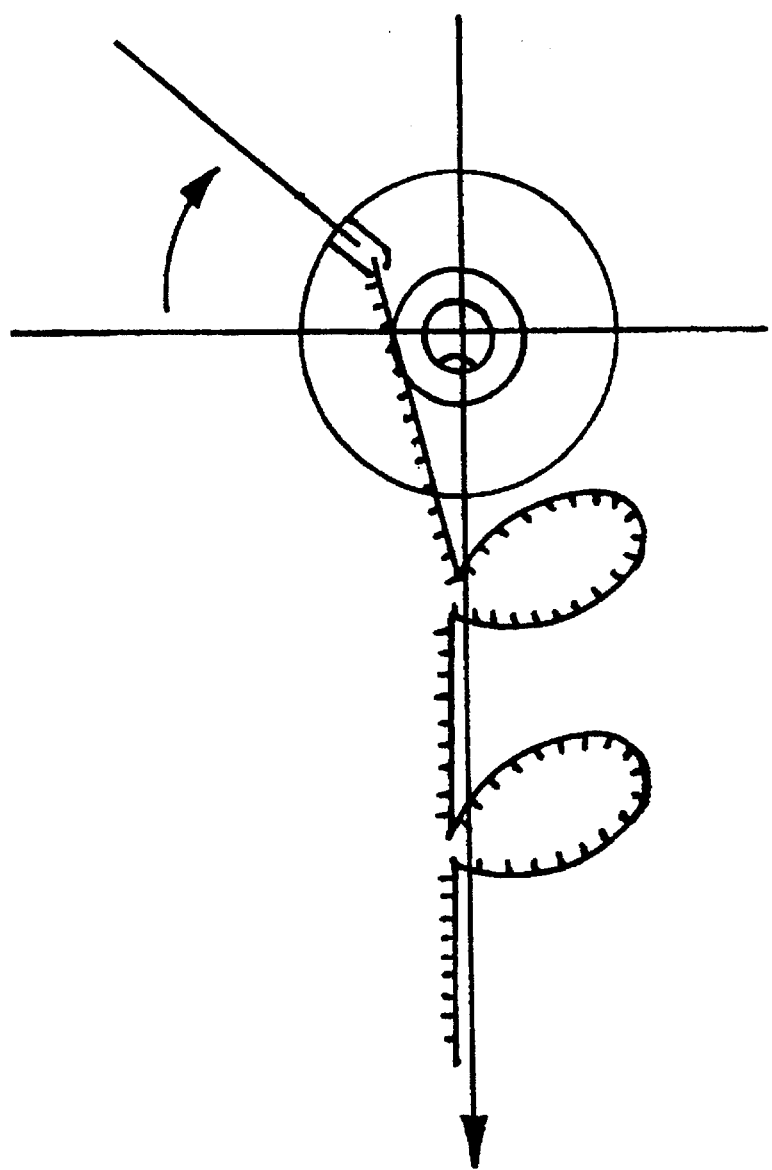
FIGS. 1A–1E are diagrammatic illustrations of a typical prior art method of providing a chenille stitch with a loop or moss stitch.
Figure 1B:
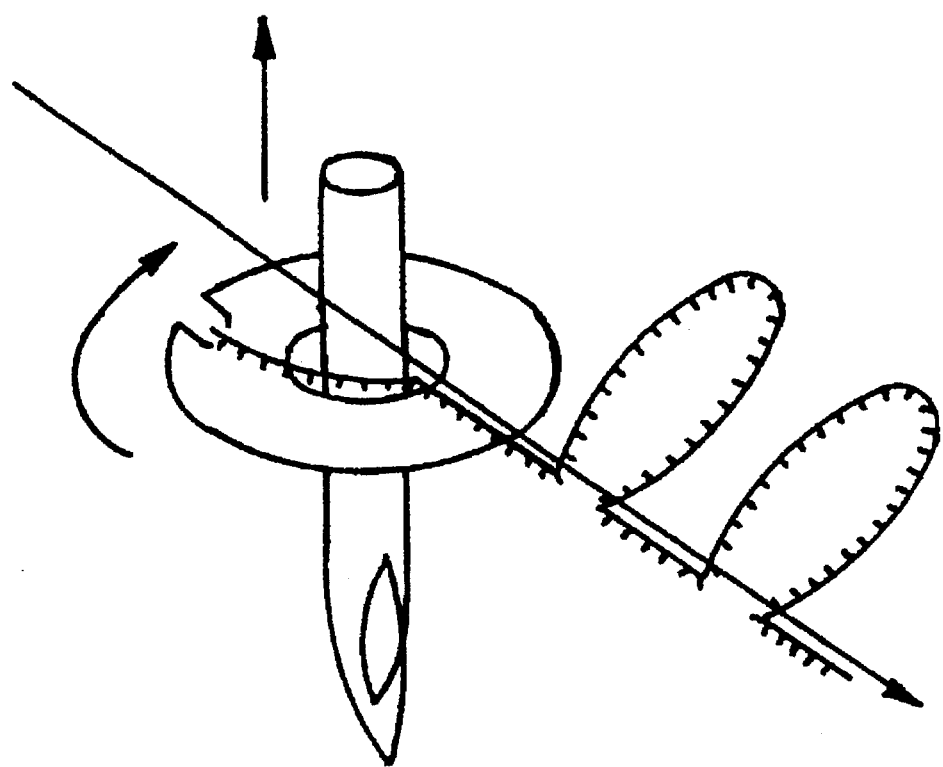
Figure 1C:
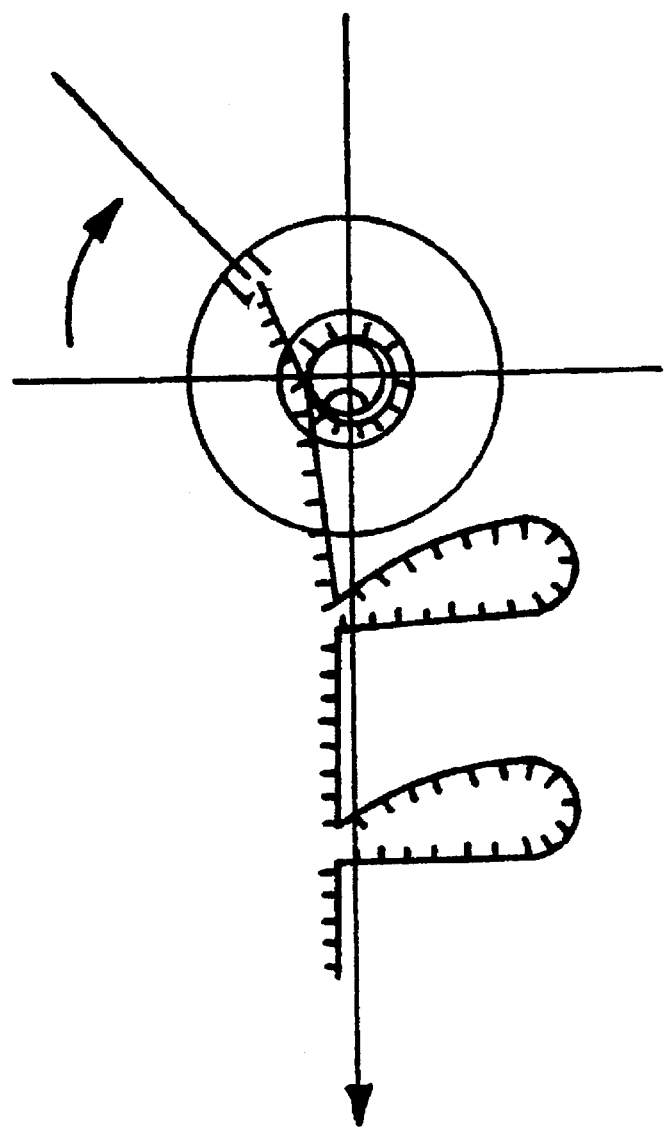
Figure 1D:
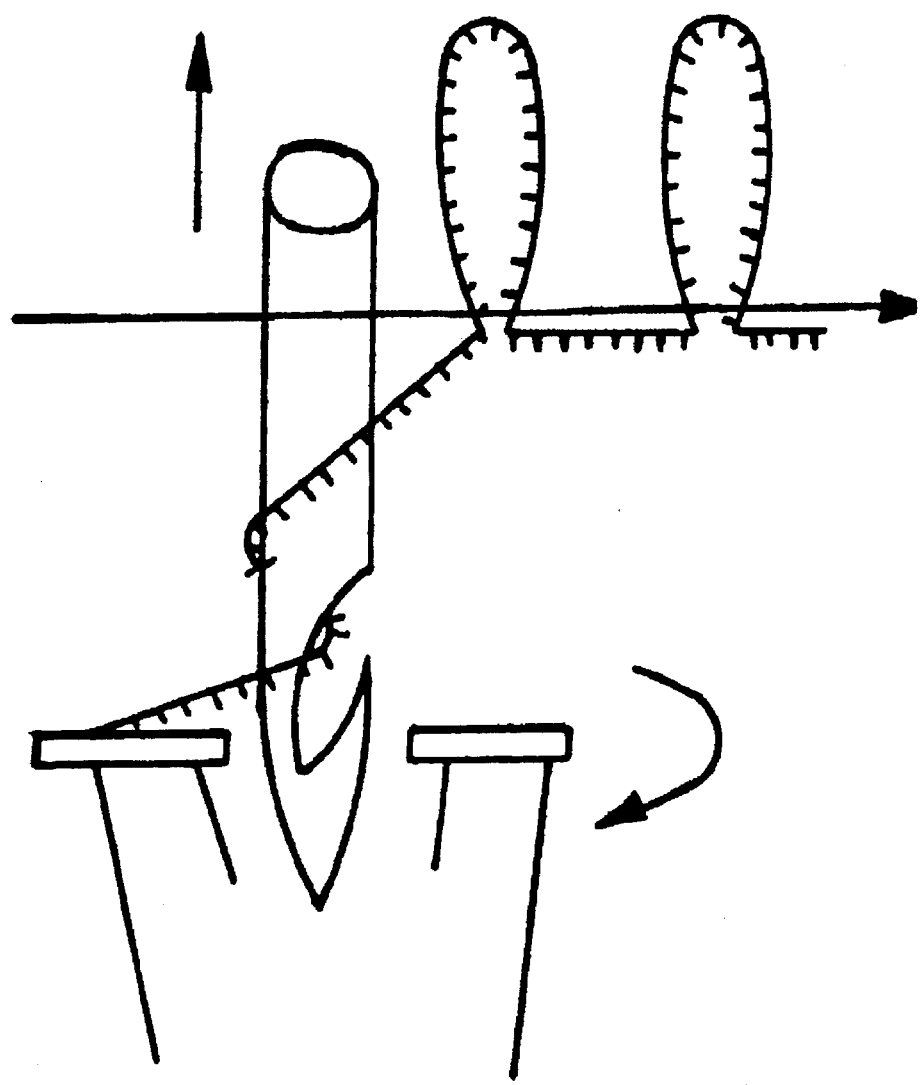
Figure 1E:
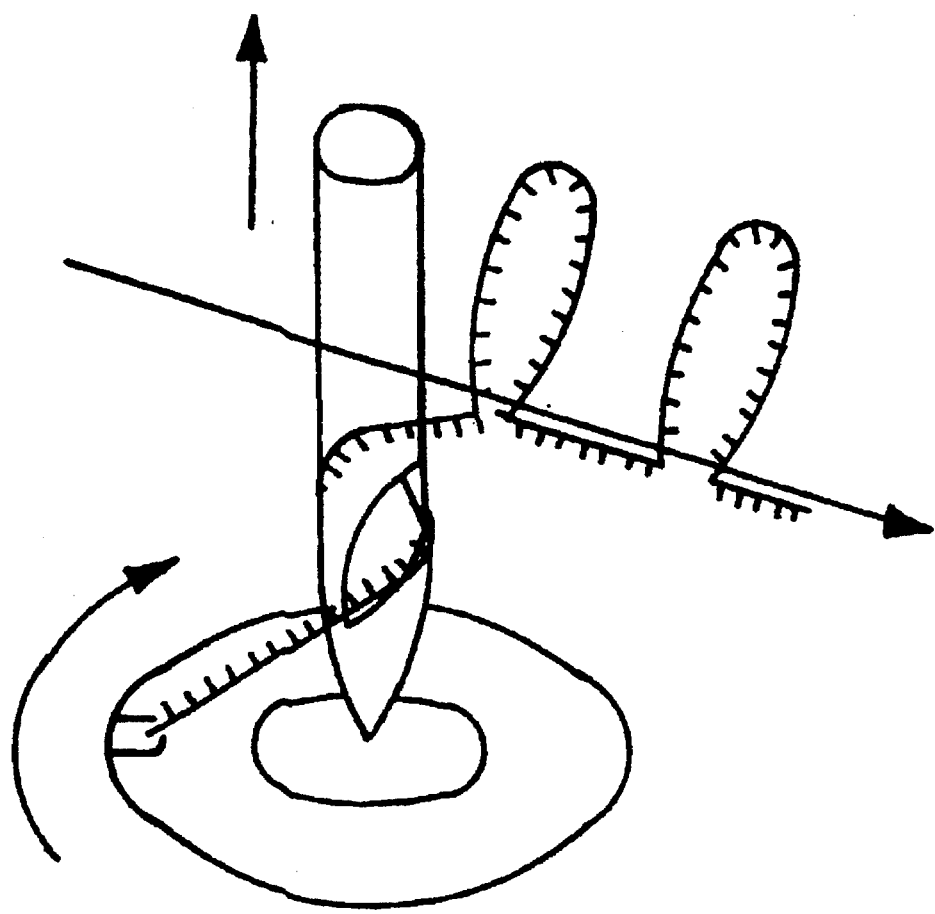
Figure 2A:
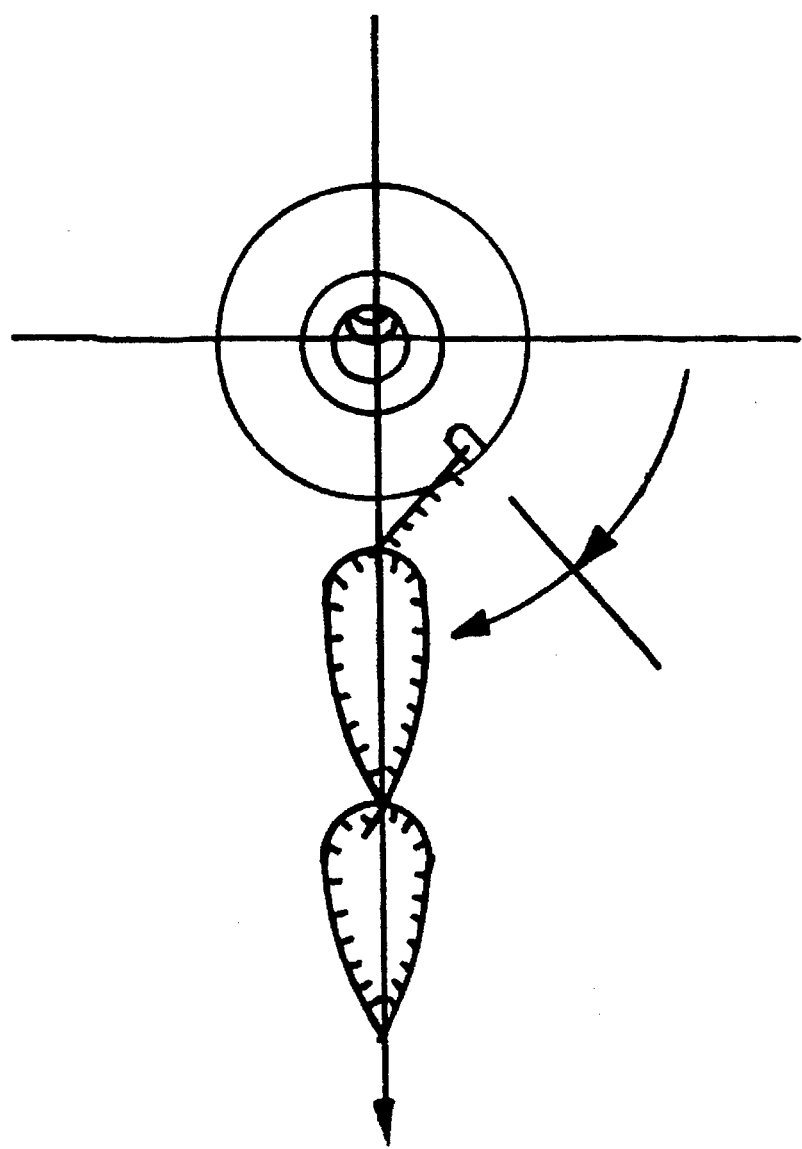
FIGS. 2A–2E are diagrammatic illustrations of a typical prior art method of providing a chain stitch.
Figure 2B:
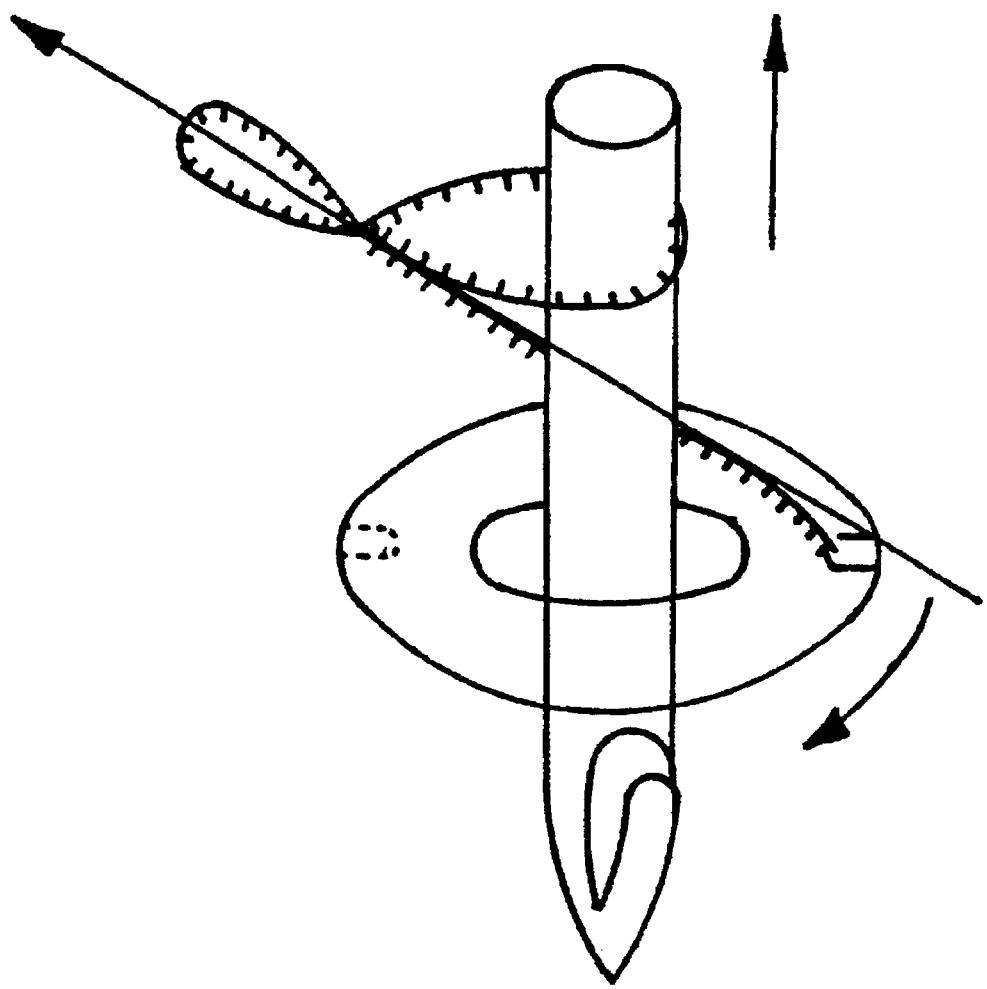
Figure 2C:
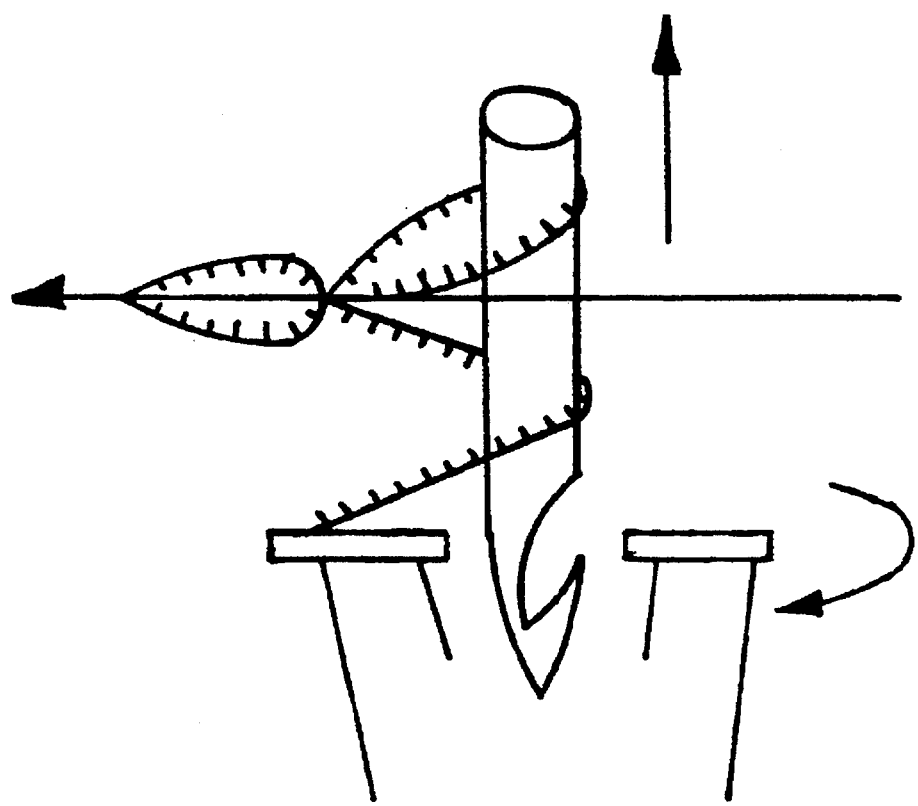
Figure 2D:
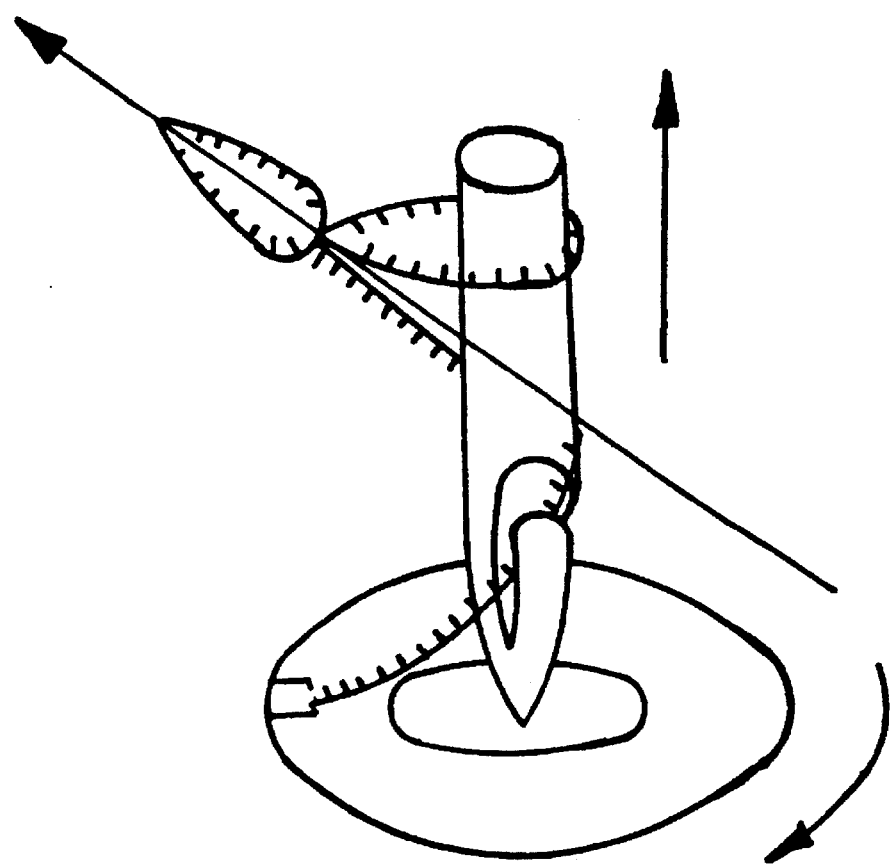
Figure 2E:
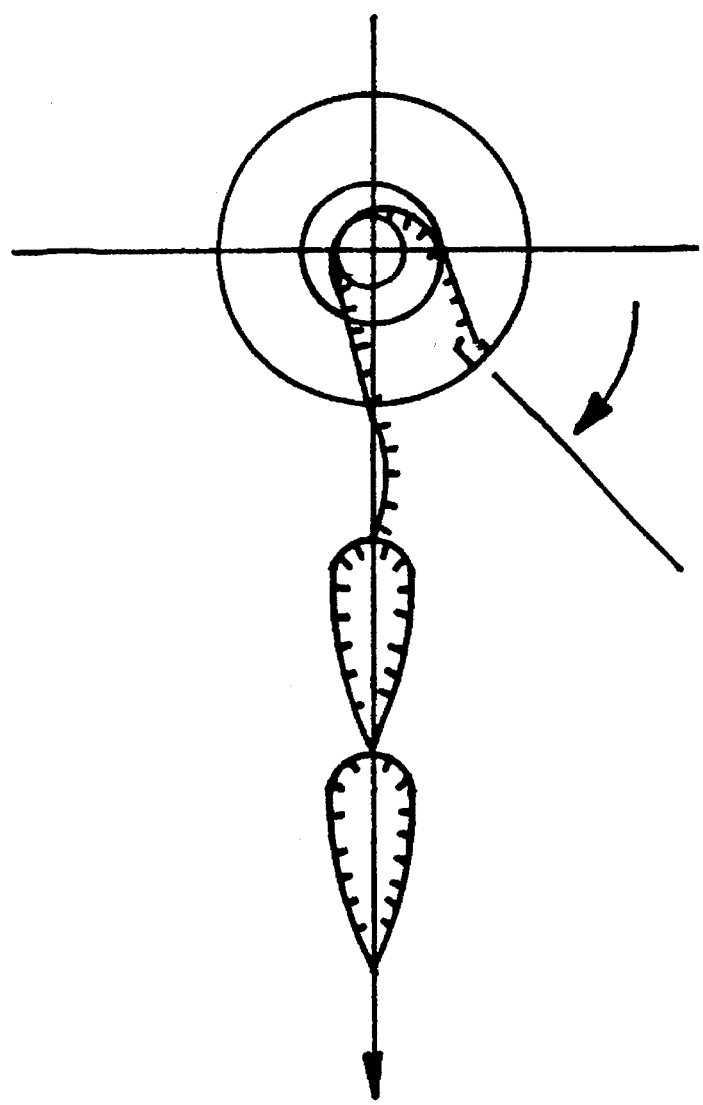
Figure 3:
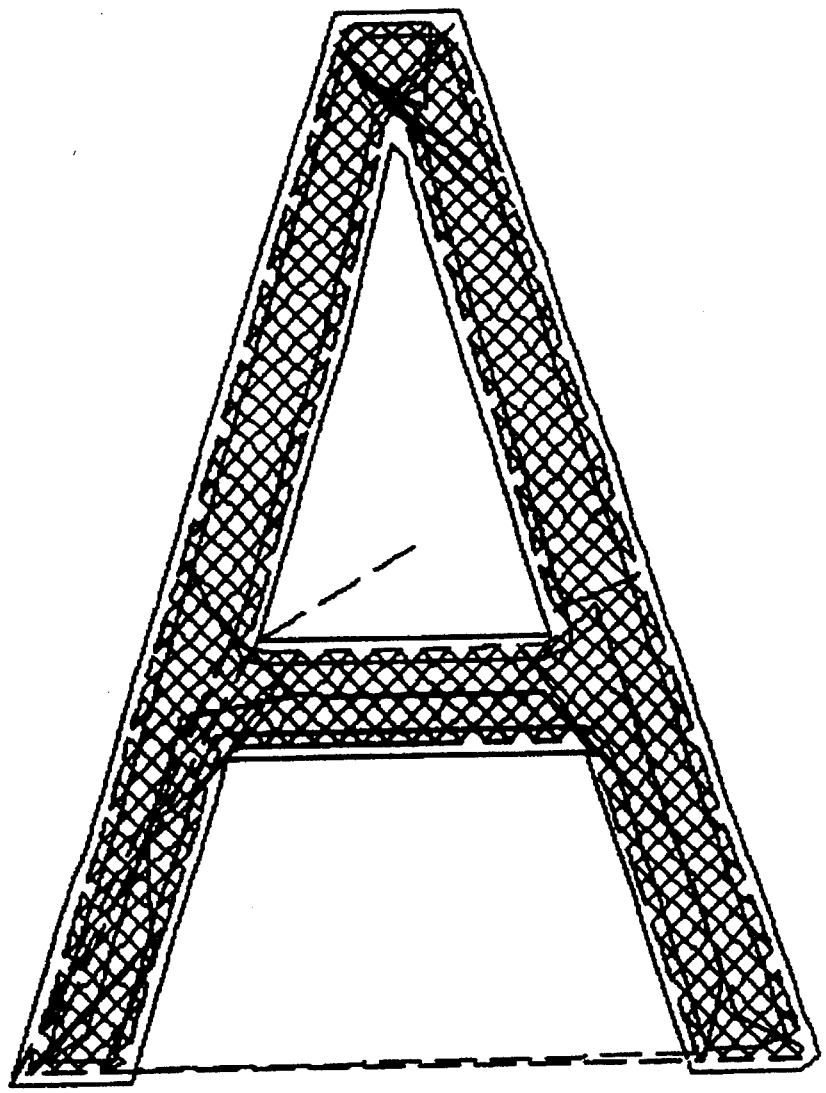
FIG. 3 is a diagrammatic illustration of a typical cross hatch or lattice chenille.
Figure 4A:
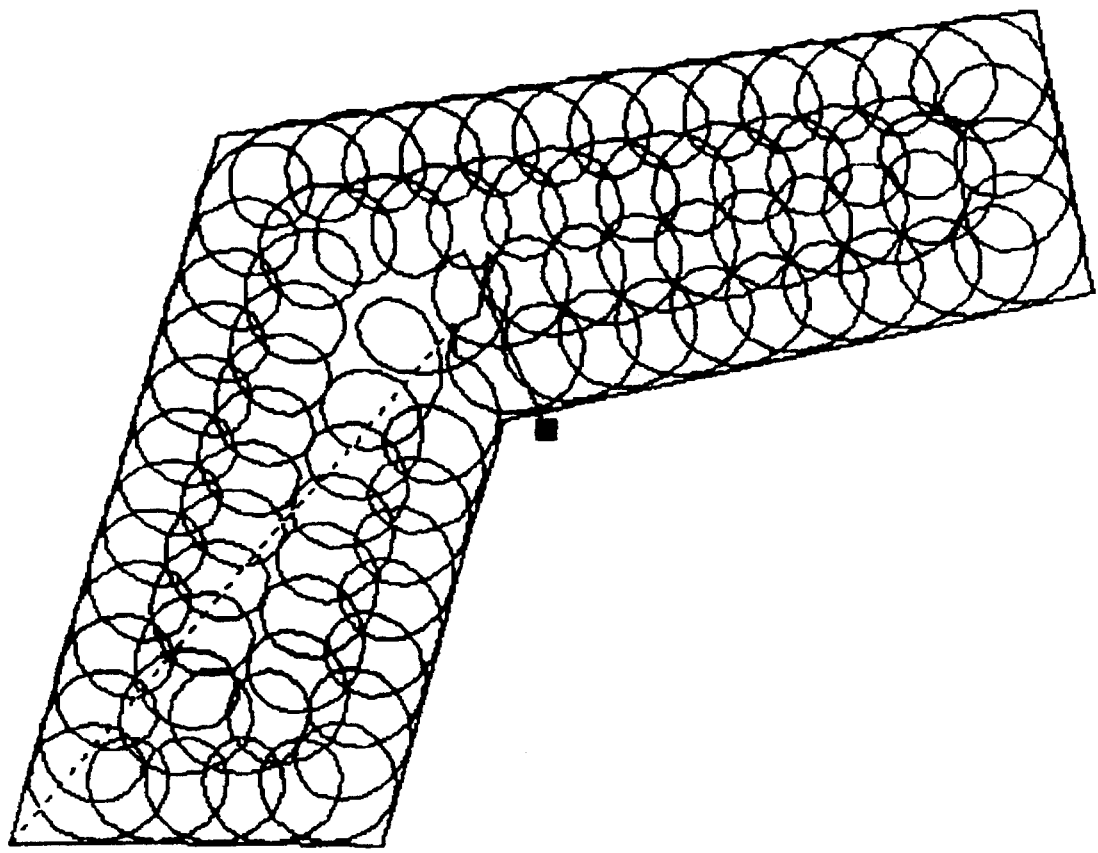
FIG. 4 is a diagrammatic illustration of a computer generated spiral type chenille in accordance with the preferred method of the present invention.
Figure 4B:
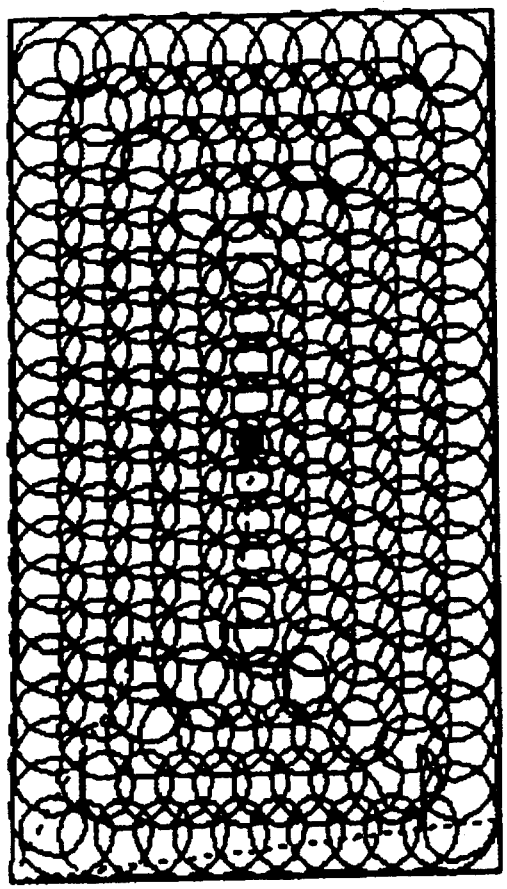

After this, preferably along these constructed polygons, spirals, like a spirograph, are placed, of varying size, in order to maintain a consistent filling of the area. Preferably the size of the spiral and the distance between the focal points from one to the next are the other determinant to the density of the fill. In placing the spirals, preferably prolate cycloids are generated. The stitches are then preferably placed along the spirals, at specified lengths, such as illustrated in FIG. 4.

Figure 5:
FIG. 5 is a diagrammatic illustration of a design made entirely by placing chain stitches to cover the area in accordance with the preferred method of the present invention.

Chain stitching is a necessary stitch around all chenille and, as shown and preferred in FIG. 8, the presently preferred method of the present invention also enables chain stitches to be automatically generated. In this instance, preferably the same procedure as for generating chenille stitches is employed up through the sorting of the concentric polygons. Thereafter, however, rather than placing spirals along the polygons, chain stitches are placed on the perimeter of the concentric polygons at a specified length. In this regard, if desired, an entire shape can be covered by chain stitches such as illustrated in FIG. 5. Thus, the chain stitching method of the present invention is not restricted to chenille and can be used in embroidery or any other concentric coverage of shapes.

It should be noted that the above described method of the present invention may be preferably carried out by conventionally programming the computer of the computer aided design system to carry out the above steps.

What is claimed is:

1. In a method for automatically generating filled embroidery stitch patterns in a computer aided design system comprising a computer means capable of generating embroidery stitch patterns for controlling an embroidery machine in accordance with a selected embroidery stitch pattern, wherein said filled embroidery stitch patterns comprise filled embroidery stitch patterns having a polygon type shape and an associated fill density; the improvement comprising the steps of:

selecting an embroidery stitch pattern for said computer means to generate for controlling said embroidery machine, said selected embroidery stitch pattern having an associated polygon type shape having an outer edge;

determining a medial axis for said selected polygon type shape in said computer means;

constructing a plurality of spaced apart polygon type shapes in said computer means which are concentic to said selected polygon type shape and extending from said outer edge to said medial axis, said computer constructed polygon type shapes being spaced apart from an adjacent concentric polygon type shape by a predetermined distance comprising a determinant of the fill density associated with said selected polygon type shape;

sorting said constructed concentric polygon type shapes in said computer means in order for providing for proper sequencing and minimal jumping of said selected stitch pattern in said embroidery machine from one part of said associated shape to another part of said associated shape;

generating a plurality of spirals of varying size in said computer means and placing said computer generated plurality of spirals of varying size in said embroidery machine along said computer constructed concentric polygon type shapes for maintaining a consistent filling of the area contained within said associated shape of said selected pattern, the spirals having an associated size and distance in said embroidery machine between the focal points from one spiral to the next comprising another determinant of said fill density associated with said selected polygon type shape; and stitching along said plurality of placed spirals in said embroidery machine for creating thread loops for providing a chenille type stitching for filling said selected polygon type shape; whereby a chenille filled embroidery pattern is automatically generated for said embroidery machine under control of said computer means in said computer aided design system.

2. An improved method for automatically generating filled embroidery stitch patterns in accordance with claim 1 wherein said selecting step comprises the step of creating a desired polygon type outer shape in said computer means to be converted into said chenille filled embroidery stitch pattern.

3. An improved method for automatically generating filled embroidery stitch patterns in accordance with claim 2 wherein said creating step comprises the step of inputting said desired polygon type shape to said computer means in said computer aided design system.

4. An improved method for automatically generating filled embroidery stitch patterns in accordance with claim 1 further comprising the step of providing chain stitching in said embroidery machine around said selected polygon type shape for covering said chenille filled embroidery pattern with chain stitches.

5. An improved method for automatically generating filled embroidery stitch patterns in accordance with claim 4 wherein said chain stitch providing step comprises the step of placing said chain stitches in said embroidery machine on the perimeter of said computer constructed concentric polygon type shapes at a predetermined length.

6. An improved method for automatically generating filled embroidery stitch patterns in accordance with claim 1 wherein said spiral placing step comprises the step of generating prolate cycloids in said computer means.

7. An improved method for automatically generating filled embroidery stitch patterns in accordance with claim 1 wherein said step of determining said medial axis comprises the steps of creating rays in said computer means emanating in towards said selected polygon type shape from every corner of said selected shape that is less than 90 degrees, and constructing two rays in said computer means pointing in a direction normal to one of the edges of each corner having an interior angle greater than 90 degrees.

8. An improved method for automatically generating filled embroidery stitch patterns in accordance with claim 7 wherein said ray creating step in said computer means comprises the step of constructing a vector in said computer means that bisects the angle of the corner for said corners of said selected shape that are less than 90 degrees.

9. An improved method for automatically generating filled embroidery stitch patterns in accordance with claim 1 wherein said step of constructing said plurality of spaced apart concentric polygon type shapes in said computer means comprises the step of, for all segments in said shape, constructing a new polygon in said computer means made up of those edges of said medial axis that are closest to the edge being considered for each edge in said selected polygon type shape.

10. An improved method for automatically generating filled embroidery stitch patterns in accordance with claim 9 wherein said step of constructing said plurality of spaced apart concentric polygon type shapes in said computer means further comprises the step of sweeping a line through said polygon type shape and computing in said computer means all the segments of all positions of said line that fall in the interior of said polygon type shape.

11. An improved method for automatically generating filled embroidery stitch patterns in accordance with claim 10 wherein said step of constructing said plurality of spaced apart concentric polygon type shapes in said computer means further comprises the step of determining in said computer means for each of said edges which edges are adjacent to it for constructing said concentric polygon type shapes in said computer means.

* * * * *